United States Patent
Fraser et al.

[11] Patent Number: 5,835,595
[45] Date of Patent: Nov. 10, 1998

[54] METHOD AND APPARATUS FOR CRYTOGRAPHICALLY PROTECTING DATA

[75] Inventors: Alexander Gibson Fraser, Bernardsville; Srinivasan Keshav; A. M. Odlyzko, both of Berkeley Heights, all of N.J.

[73] Assignee: AT&T Corp, Middletown, N.J.

[21] Appl. No.: 707,691

[22] Filed: Sep. 4, 1996

[51] Int. Cl.⁶ .................................................. H04L 9/32
[52] U.S. Cl. .............................................. 380/25; 380/30
[58] Field of Search ................................. 380/21, 23, 25, 380/29, 30

[56] References Cited

U.S. PATENT DOCUMENTS

| | | | |
|---|---|---|---|
| 4,438,824 | 3/1984 | Mueller-Schloer | 380/30 |
| 4,458,109 | 7/1984 | Mueller-Schloer | 380/30 |
| 4,578,531 | 3/1986 | Everhart et al. | 380/21 |
| 4,825,050 | 4/1989 | Griffith et al. | 380/29 |
| 5,073,933 | 12/1991 | Rosenthal | 380/30 |
| 5,157,726 | 10/1992 | Merkle et al. | 380/23 |
| 5,249,230 | 9/1993 | Mihm, Jr. | 380/30 |
| 5,295,188 | 3/1994 | Wilson et al. | 380/30 |
| 5,497,421 | 3/1996 | Kaufman et al. | 380/25 |
| 5,497,422 | 3/1996 | Tysen et al. | 380/25 |
| 5,535,276 | 7/1996 | Ganesan | 380/25 |
| 5,568,552 | 10/1996 | Davis | 380/30 |
| 5,638,446 | 6/1997 | Rubin | 380/25 |
| 5,646,999 | 7/1997 | Saito | 380/25 |
| 5,696,827 | 12/1997 | Brands | 380/30 |

Primary Examiner—Salvatore Cangialosi

[57] ABSTRACT

A method and apparatus for transferring encrypted information to a database. First certification information is transferred from a first database to a second database. Second certification information is then transferred from the second database to the first database, where both the first certification information and the second certification information is authenticated. If both certifications are authenticated, the transfer of the encrypted information to the second database is enabled.

53 Claims, 3 Drawing Sheets

METHOD AND APPARATUS FOR CRYTOGRAPHICALLY PROTECTING DATA

BACKGROUND OF THE INVENTION

1. Field of the Invention

The present invention relates to the field of data communications. More particularly, the present invention relates to controlling secure transfer of information such as audio, video and textual information.

2. Description of the Related Art

The technology to build a digital audioserver capable of serving thousands of customers is possible. However, once digitized music data is made public, it can be copied at will without regard to copyrights. Consequently, digitized music data must be safeguarded before such an audioserver can be a commercially successful endeavor.

What is needed is a secure cryptographic scheme that assures that music sold to a user cannot be resold or usefully copied, that untrusted music vendors can conveniently distribute music, and that few operations are involved in setting up a secure music service.

SUMMARY OF THE INVENTION

The present invention advantageously allows retail distribution of any digital asset such as, for example, software, music, art, books, videos, etc., and minimizes the number of secrets and interaction necessary with a registration authority. Since each digital asset is encrypted with a special secret key $\lambda_T$ for that specific asset, and can be played or used only when the special key is purchased, the present invention advantageously allows secure broadcast of digital assets, which is critical for cable, radio, or satellite distribution. Thus, secure cable distribution of software, music, magazines, newspapers is possible. Further, such devices like music vending machines, for example, are possible.

The advantages of the present invention are provided by a method and an apparatus for transferring decrypted information to a database. According to the invention, first certification information is transferred from a first database, for example, in a certification module, to a second database in, for example, a personality module. Second certification information is then transferred from the second database to the first database, where both the first certification information and the second certification information is authenticated. If both certifications are authenticated, the transfer of the decrypted information to the second database is enabled.

BRIEF DESCRIPTION OF THE DRAWING

The present invention is illustrated by way of example and not limitation in the accompanying figures in which like reference numerals indicate similar elements and in which.

DETAILED DESCRIPTION

According to the invention, each digital asset, such as, for example, software, music, art, books, videos, etc., is encrypted with its own secret key so that the asset is locked. To simplify the description of the present invention, the exemplary digital asset that is used in the following description is a piece of music, which is simply denoted as a piece or title T. A piece of music encrypted using the scheme of the present invention can be broadcast freely because it cannot be played unless the secret key for the piece is known. The music piece can be obtained from any medium, such as a public airwaves broadcast, a cable network system, or the internet, for example, but the music is locked because it is encrypted. To play the music, a user must purchase a special information key for the specific piece of music. A user can purchase as many information keys as desired and keep them in a personality module (PM) that is preferably credit-card sized, for example, and that preferably stores a plurality of information keys. A personality module is used with a player device for outputting an encrypted piece of music in a useable manner. The personality module is secure, that is, it cannot be duplicated by a user, and is capable of single and public key encryption and decryption, and stream decryption of a digital asset for playback. The personality module is also capable of storing secret encryption keys that cannot be determined by opening up the device and observing the circuits of the module.

While decrypted music might be in the analog domain, and thus of poorer quality, or so bulky that it is not worth reselling, the encryption scheme of the present invention is appropriate for all digital information. Further, the digital information decrypted using the scheme of the present invention is indelibly marked with a unique identification ID of a personality module. Thus, a user who resells or misuses decrypted information can be traced through the ID and dealt with accordingly.

Figure 1:
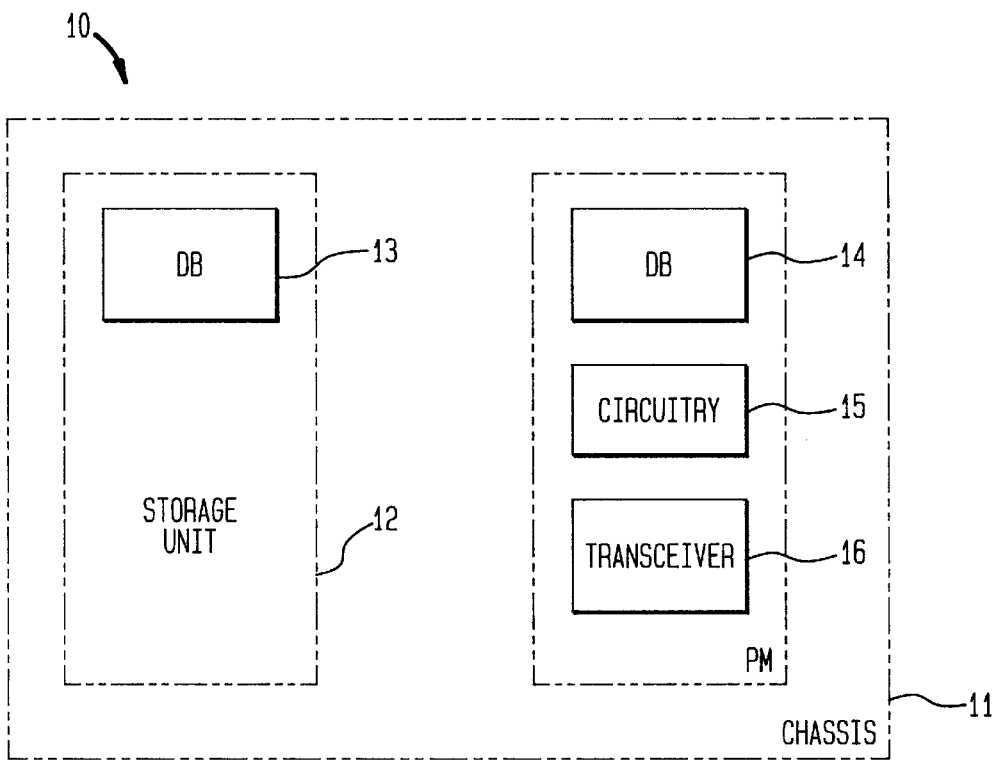
FIG. 1 shows a schematic block diagram of a player according to the present invention.

FIG. 1 shows a schematic block diagram of a player 10 according to the present invention. Generally speaking, player 10 has three parts: a chassis 11 that provides power, display and other ancillary functions; a portable storage unit 12 containing a memory or database 13; and a personality module PM. Personality module PM contains circuitry 15 that provides single and public key encryption and decryption, and stream decryption in a well-known manner. Personality module PM also stores a secret key ρ and a public key PuA from a certification authority in a memory or database 14. Personality module PM preferably includes a transceiver device 16, such as an RF transceiver or an infrared transceiver, for transmitting and receiving signals for authentication purposes. In the alternative, transceiver 16 can be replaced by an interface device configured in a well-known manner for receiving and transmitting digital signals.

Each user can own a plurality of personality modules. Each personality module owned by a user has the same secret key ρ. Thus, the user can simultaneously play a particular piece of music on as many different players 10 as personality modules owned by the user. For example, a user may have a PM for a car stereo, and other PMs for players at home and at the office.

Additionally, a user may give several PMs to friends or relatives so that they can share music.

Each PM has a unique serial number or identification ID that is stored in database 14. The manufacturer keeps a secure database of the identification ID for each player. A user then registers a PM at the time of purchase with a registration card, for example, so if a personality module is accidently lost or destroyed, a registered personality module can be regenerated. Alternatively, an authorized agent can create a duplicate PM from a working PM by accessing ρ in the manner described below. In this situation, if a user initially had two PMs and one was accidentally lost or destroyed, a replacement PM can be made from the remaining PM.

Storage unit 12 is removable from chassis 11 so that a user can carry music when visiting friends or traveling. By plugging a storage unit 12 and a personality module PM into a player 10, music stored in storage unit 12 can be played. Storage unit 12 is preferably capable of rough handling, and preferably the size of a credit card. Storage unit 12 and database 13 can also be configured to be part of database 14 in the personality module.

Figure 2:
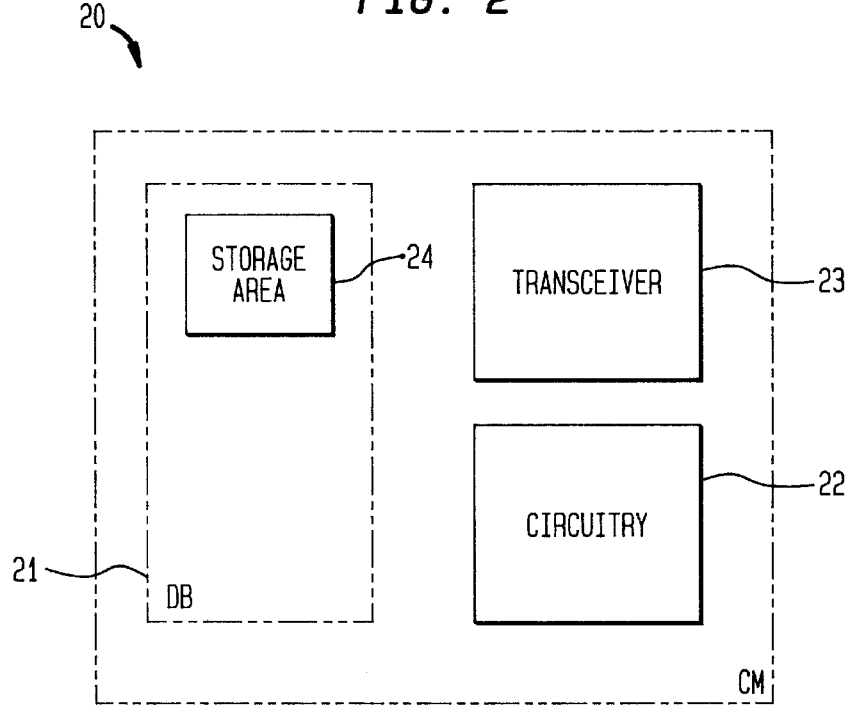
FIG. 2 shows a schematic block diagram of a certification module according to the present invention.

FIG. 2 shows a schematic block diagram of a certification module (CM) 20 according to the present invention. Certification module 20 includes a memory or database 21 and a transceiver 22. Certification module 20 also includes circuitry 22 that provides single and public key encryption and decryption in a well-known manner. Database 21 stores keys and other information that are used for an authentication process. Database 21 also includes a storage area 24 used for storing information that can be used for auditing and/or limiting the number of copies of an asset that a user can purchase and/or that a vendor can sell. Transceiver 23 transmits and receives signals used for the authentication process. Transceiver 23 can be an RF or an infrared transceiver that is compatible with transceiver 16 of personality module PM. In the alternative, transceiver 23 can be replaced by an interface device that is configured in a well-known manner for receiving and transmitting digital signals to a personality module, and that is compatible with transceiver 16.

When buying music in person, a user plugs a PM into a device containing a secure certification module or brings the PM into proximity with a certification module, and obtains an encrypted piece of music and the key required for decrypting the music. When the piece of music is purchased, the personality module PM used is authenticated by the secure certification module (CM) operated by a vendor who collects payments. Generally speaking, the vendor does not have to be trusted by the music supplier because the authentication process authenticates both the certification module CM and the personality module PM by having each module exchange certificates issued by a common trusted authority. After successful authentication, the certification module enables the vendor to send the secret key to the buyer's personality module for the purchased piece of music so that the music can be played. The transmission of the secret key for the purchased music is encrypted so there is no need for physical contact between the two modules. That is, the entire transaction can be done over a unsecure data link such as a local area network (LAN), a wide area network (WAN), at a point of sale device, via an RF transmission or an infrared transmission. Both the personality module and the certification module are physically secure pieces of hardware that are tamper-resistant using well-known techniques so that the secret encryption keys that are used are not able to be determined by observing their respective circuits.

Figure 3A:
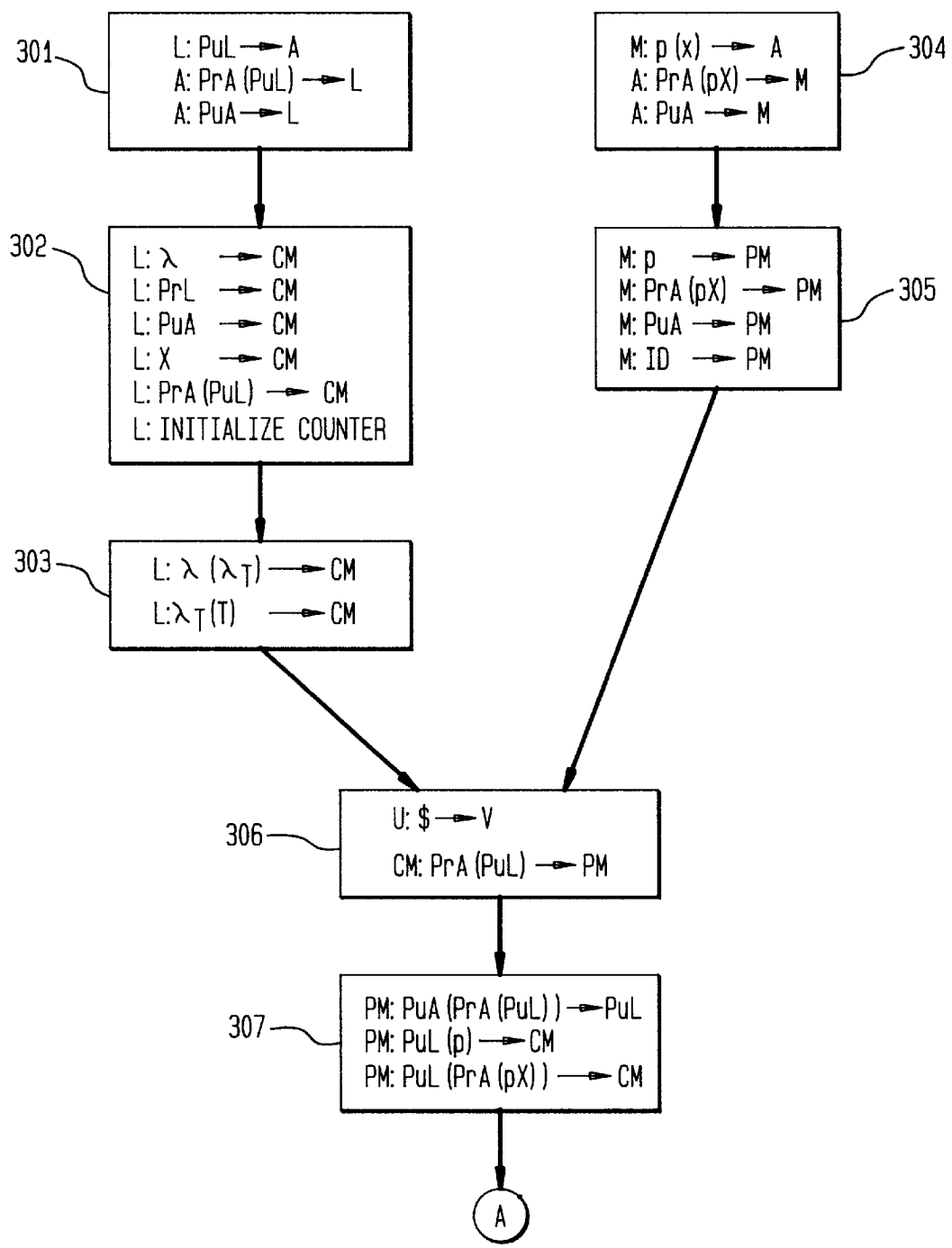
FIGS. 3A and 3B show a flow diagram of a transaction for purchasing a piece of music according to the present invention.
Figure 3B:
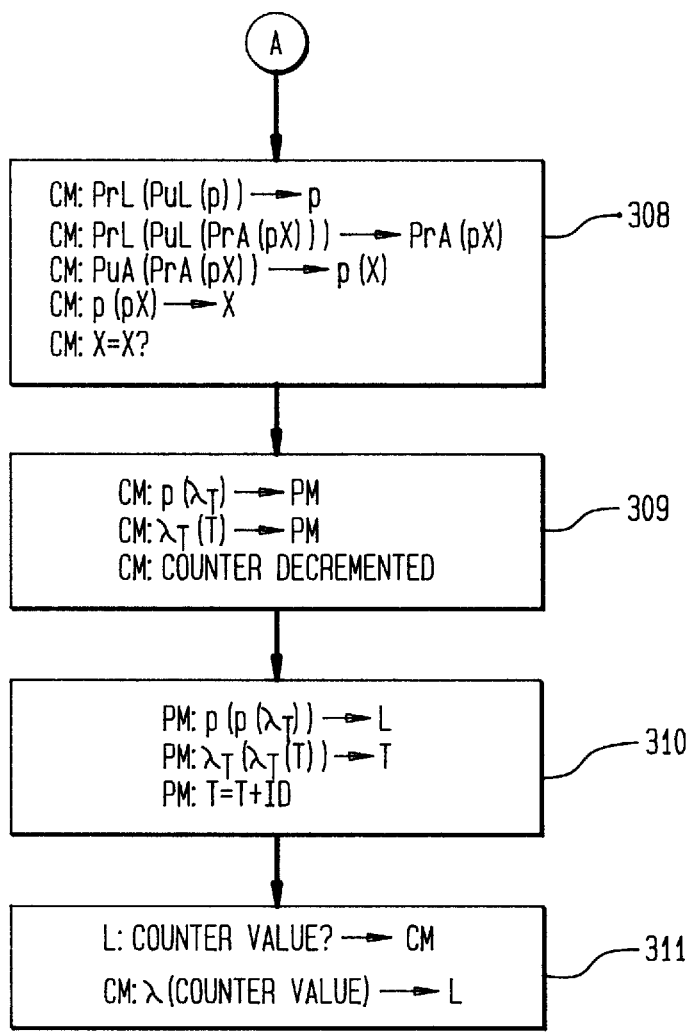

In the following illustrative example, shown in FIG. 3, generally each entity <e> has a public key Pu<e>, a private key Pr<e> and a secret key <e>. Plaintext p encrypted by a key k is denoted as k(p). According to the invention, a certifying authority A has a public key PuA, a private key PrA and a secret key α. The certifying authority certifies the authenticity of keys used by music publishing labels and personality modules. A music publishing label, denoted as entity L, has a public key PuL, a private key PrL and a secret key X. Players, denoted at P, are hardware devices (FIG. 1) that are manufactured by manufacturer M. Each player plays music and contains a personality module PM that has a secret key ρ. Vendors, denoted as V, distribute music, and generally speaking, have a certification module CM for each music publishing entity L. Users, denoted as U, purchase music from vendors V and play the music on players P. A title, denoted as T, represents a piece of music being sold. Each title has an associated secret key $\lambda_T$ determined by the music publishing label L.

Consider the example of a music publishing label L providing a piece of music T for public sale. At step 301 shown in FIG. 3, music publishing label L provides a certifying authority A with public key PuL. Certifying authority A provides a certification of public key PuL to publishing label L by encrypting public key PuL using private key PrA. That is, the certification received by publishing label L is PrA(PuL). Certifying authority A also provides the authority's public key PuA to publishing label L.

At step 302, the music publishing label L stores the label's secret key λ, the label's private key PrL, the certification authority's public key PuA, a long fixed, publicly-known character string X, and the label's certification PrA(PuL) in the database 21 of a secure certification module CM (FIG. 2). Publishing label L can also initialize a register or a storage area 24 in database 21 of certification module CM that is used for counting transactions. Certification module CM is provided to vendor V. Certification module is configured in a well-known way so that vendor V and anyone who is not authorized cannot discover these keys in any way. As previously mentioned, certification nodule CM is capable of single and public key encryption and decryption.

Publishing label L encrypts the piece of music T using a secret key $\lambda_T$ for that particular piece of music to obtain $\lambda_T(T)$. Label L also encrypts the secret key $\lambda_T$ using secret key λ to obtain $\lambda(\lambda_T)$. At step 303, publishing label L sends the encrypted key $\lambda(\lambda_T)$ and the encrypted music $\lambda_T(T)$ to the certification module CM for storage in database 21. Alternatively, publishing label L places the encrypted music $\lambda(\lambda_T)$ in another database that is easily accessible by the certification module. Vendor V is ready for vending the encrypted music to a user.

A personality module PM is prepared at step 304 by a manufacturer M by encrypting the publicly-known character string X using the secret key ρ for the personality module to obtain ρ(X). Manufacturer M then provides ρ(X) to certification authority A. Certification authority A encrypts ρ(X) with private key PrA to obtain a certification PrA(ρX). The certification and the certification authority's public key PuA are provided to manufacturer M.

At step 305, manufacturer M stores the personality module's secret key ρ, the certification PrA(ρX), the certification authority's public key PuA and a unique identification ID for the personality module in database 14 of personality module PM (FIG. 1). Personality module PM can do single and public key encryption and decryption, and stream decryption for audio playback. Manufacturer M obtains a certification PrA(ρX) from certification authority A for each personality module produced.

At step 306, a user U, who now owns a player P with the personality module PM, initiates an authentication process by buying the piece of music T from vendor V. Personality module PM is brought into proximity with certification module CM. Vendor V transfers the certification module's certification PrA(PuL) to personality module PM. At step 307, personality module PM decrypts certification PrA(PuL) using the certification authority's public key PuA stored in PM database 14 for obtaining the publishing label's public key PuL. Personality module PM uses PuL to encrypt PM secret key $\rho$ and certificate PrA($\rho$X), which are both transferred to certification module CM.

At step 308, certification module CM uses the publishing label's secret key PrL to decrypt the personality module's secret key $\rho$ and certification PrA($\rho$X). The personality module's certification PrA($\rho$X) is decrypted using the certification authority's public key PuA. The decrypted personality module's secret key $\rho$ is then used to decrypt the character string X. The decrypted character string X is compared with the character string X stored in the certification module database 21. If both character strings match, then the personality module is authenticated.

Once the personality module PM has been authenticated, certification module CM encrypts the secret key for the music title $\lambda_T$ using the personality module's secret key $\rho$ to obtain $\rho(\lambda_T)$. The encrypted secret key $\rho$ ($\lambda_T$) and the encrypted music $\lambda_T$(T) are transferred to database 14 of the personality module at step 309, and a counter in memory area 24 corresponding to the piece of music is decremented. Alternatively, if the encrypted piece of music is stored in a database different from database 21, certification module enables transfer of the encrypted music piece to the user. As yet another alternative, the encrypted key $\rho(\lambda_T)$ is enabled to be transferred to database 14. At step 310, the personality module uses secret key $\rho$ to decrypt $\lambda_T$. Module PM then uses $\lambda_T$ to decrypt $\lambda_T$ (T) to extract music piece T. Module PM also adds its unique identification ID to music piece T so that T is tagged, or indelibly marked, allowing it to be known which personality module was used for decrypting the piece of music T. The module ID inserted into piece T is not secret, but its inserted location in music piece T is preferably secret.

Since the certification module given to vendor V and the personality module are secure, the publishing label's private key PrL and secret key $\lambda$, and the PM secret key $\rho$ remain secrets. The only information given to vendor V is the publishing label's certification PrA(PuL), the encrypted piece of music $\lambda_T$(T), and the encrypted secret key $\lambda(\lambda_T)$. Since vendor V does not know $\lambda$, the encrypted secret key $\lambda(\lambda_T)$ cannot be extracted. The only information vendor V can extract is the publishing label's public key PuL. Since the encrypted secret key $\lambda_T$(T) is not considered public knowledge, that is, it is secret, vendor V could conceivably sell $\lambda_T$(T) to other vendors for profit. This can be discouraged by having the piece of music T encrypted by $\lambda_{TV}$, that is, a per-title per-vendor key so that no other vendor could use encrypted music $\lambda_{TV}$(T).

The user sees only PuL($\rho$), $\rho(\lambda_T)$, and $\lambda_T$(T). Since $\rho$ and $\lambda_T$ are secrets, the user does not know T. The personality module receives PuL encrypted by PrA, so the personality module cannot be spoofed into transferring $\rho$ unless the publishing label's key PuL is compromised. The certification module CM receives both $\rho$ and PrA(PX). Thus, module CM knows that the personality module PM has been certified by an authority. The certification PrA($\rho$X) is used instead of merely PrA($\rho$) because a spoofing personality module could send PuL(Pu(Y),Y), for a randomly chosen Y.

Since the indelible marking in the decrypted music stream must indicate the particular personality module used to decrypt piece T, the PM must mark the decrypted music at the time of purchase. The indelible marking preferably should not modify the intended behavior of the decrypted data stream. For example, if the decrypted data stream is to be interpreted as software (binary application code), the ID should later not be misinterpreted as program instructions. Instead, a consumer device using the decrypted information, that is, a player, a computer, etc., must be aware that some meta-data, that is, the ID of a PM, is intermingled with the decrypted data.

Meta-data might be intermingled with each form of decrypted data in a different way. To allow for this, the decrypted data preferably contains (in some well-known location) a marker describing its type, for example, AUDIO, or SOFTWARE APPLICATION, or BOOK. The PM would have type-specific routines used for inserting the identification ID into the decrypted data stream. The consumer device using the decrypted data would then have type-specific functions for distinguishing between meta-data and data, in addition to a function revealing the ID when queried by an authorized agent. The publishing label L preferably is responsible for creating information that allows some meta-data to be indelibly added and for creating routines for the PM for adding the identification ID to the decrypted information. Additionally, they are responsible for creating consumer devices of decrypted information that can distinguish between data and meta-data, preventing wide-scale misuses of decrypted information.

When the publishing label L wants to audit vendor V with respect to music piece T, label L sends a request to the certification module for the value stored in the register in memory space 24 corresponding to music piece T. At step 311 in FIG. 3, certification module CM encrypts the value of the register using secret key $\lambda$. Since the counter value is encrypted and the certification module is secure, vendor V cannot tamper with this value. When the counter for music piece T counts down from an initial value to zero, for example, the certification module stops authenticating personality modules for music piece T until the publishing label L transfers a reauthorization message encrypted with $\lambda$ for preventing fraud.

It may be inconvenient for a vendor to have certification modules for every publishing label, particularly when handling titles from small or foreign labels. Thus, an agency can act on behalf of a group of labels by issuing a single certification module for a group of publishing labels, and by collecting and distributing royalties appropriately.

While the present invention has been described in connection with the illustrated embodiments, it will be appreciated and understood that modifications may be made without departing from the true spirit and scope of the invention.

What is claimed is:

1. A method for transferring selected information T to a database, the method comprising the steps of:

storing a first certification information PrA(PuL) in a first database. the first certification information including a first public key PuL encrypted using a first private key PrA;

storing a character string X in the first database;

storing a second certification information in a second database, the second certification information including the character string X encrypted using a first secret key $\rho$, and the encrypted character string $\rho$(X) encrypted using the first private key PrA;

transferring the first certification information PrA(PuL) from the first database to a second database;

transferring the second certification information PrA($\rho$(X)) from the second database to the first database;

verifying at the first database that the character string X stored in the first database equals the character string X contained in the second certification information; and enabling the transfer of the selected information T to the second database when the character string X stored in the first database equals the character string X contained in the second certification information.

2. The method according to claim 1, further comprising the steps of:

encrypting a second secret key $\lambda_T$ using a third secret key $\lambda$;

storing a second public key PuA, the encrypted second secret key $\lambda(\lambda_T)$, the second secret key $\lambda$ and a second private key PrL in the first database; and storing the first secret key $\rho$ and the second public key PuA in the second database.

3. The method according to claim 2, wherein the step of transferring the second certification information $PrA(\rho(X))$ from the second database to the first database includes the steps of:

decrypting the first certification information PrA(PuL) at the second database using the second public key PuA stored in the second database;

encrypting the first secret key $\rho$ at the second database using the first public key PuL decrypted at the second database;

encrypting the second certification information $PrA(\rho(X))$ at the second database using the first public key PuL decrypted at the second database; and transferring the encrypted first secret key $PuL(\rho)$ and the encrypted second certification information $PuL(PrA(\rho(X)))$ from the second database to the first database.

4. The method according to claim 3, wherein the step of verifying at the first database that the character string X stored in the first database equals the character string X contained in the second certification information includes the steps of:

decrypting the encrypted first secret key $PuL(\rho)$ at the first database using the second private key PrL stored in the first database;

decrypting the encrypted second certification information at the first database using the second private key PrL stored in the first database and the first secret key p decrypted at the first database; and verifying that the character string X stored in the first database equals the character string X contained in the second certification information decrypted at the first database.

5. The method according to claim 4, wherein the step of enabling the transfer of the selected information T to the second database includes the steps of:

encrypting the second secret key $\lambda_T$ using the first secret key $\rho$ decrypted at the first database when the character string X stored in the first data base equals the character string X contained in the second certification information;

transferring the encrypted second secret key $\rho(\lambda_T)$ to the first database;

enabling the transfer of the selected information T to the second database when the character string X stored in the first database equals the character string X contained in the second certification information, the transferred selected information T being encrypted using the second secret key $\lambda_T$; and receiving the encrypted selected information $\lambda_T(T)$ at the second database.

6. The method according to claim 5, further comprising the steps of:

storing the encrypted second secret key $\rho(\lambda_T)$ encrypted at the first database in the second database;

storing the encrypted selected information T in the second database;

decrypting the second secret key $\lambda_T$ at the second database using the first secret key $\rho$; and decrypting the encrypted selected information $\lambda_T(T)$ at the second database using the second secret key $\lambda_T$ decrypted at the second database.

7. The method according to claim 6, further comprising the step of encrypting the selected information T using the second secret key $\lambda_T$.

8. The method according to claim 7, wherein the encrypted selected information T is stored in a third database.

9. The method according to claim 8, wherein the first and third databases are the same.

10. The method according to claim 7, wherein the first database is associated with a certification module, and the second database is associated with a personality module.

11. The method according to claim 10, wherein the transferred selected information T is one of audio digital data, video digital data and textual digital data.

12. The method according to claim 6, wherein the second database further includes an identification information ID, and wherein the step of decrypting the encrypted information $\lambda_T(T)$ includes the step of inserting the identification information ID into the decrypted information.

13. The method according to claim 5, further comprising the step of recording each occurrence of transferring from the first database to the second database the second secret key $\rho(\lambda_T)$ encrypted at the first database.

14. The method according to claim 13, further comprising the step of comparing a number of recorded occurrences to a predetermined number.

15. A system comprising:

a certification module having an associated first database storing a first certification information PrA(PuL), a first public key PuA, an encrypted first secret key $\lambda(\lambda_T)$, a second secret key $\lambda$, a first private key PrL and a character string X, the first certification information being formed by encrypting a second public key PuL using a second private key PrA, and the encrypted first secret key $\lambda_T$ being encrypted using the second secret key $\lambda$; and a personality module having an associated second database storing a third secret key $\rho$, the first public key PuA and second certification information $PrA(\rho X)$, the second certification information $PrA(\rho(X))$ being formed from the character string X being encrypted by the third secret key $\rho$ and the encrypted character string $\rho(X)$ being further encrypted by the second private key PrA, the personality module receiving the first certification information from the certification module, decrypting the first certification information using the first public key PuA stored in the personality module to obtain the second public key PuL, encrypting the third secret key $\rho$ using the decrypted second public key PuL, encrypting the second certification information $PrA(\rho(X))$ using the decrypted second public key PuL and transferring the encrypted third secret key $PuL(\rho)$ and the encrypted second certification information $PuL(PrA(\rho(X)))$ to the certification module, and the certification module decrypting the encrypted third secret key $PuL(\rho)$ using the first private key PrL, decrypting the encrypted second certification information $PuL(PrA(\rho(X)))$ using the first private key PrL, further decrypting the second certification information using the first public key PuA to obtain the character string X contained in the second certification information, and enabling transmission of selected information T to the personality module when the character string X stored in the first database equals the character string X contained in the second certification information.

16. The system according to claim 15, wherein the selected information T is one of audio, visual and textual information.

17. The system according to claim 16, wherein the selected information T is digital information.

18. The system according to claim 17, wherein the selected information T is encrypted using the first secret key $\lambda_T$, and wherein, when the character string X contained in the second certification information equals the character string X stored in the first database, the certification module encrypts the first secret key $\lambda_T$ using the third secret key $\rho$ decrypted by the certification module, and transfers the encrypted first secret key $\rho(\lambda_T)$ and the encrypted selected information $\lambda_T(T)$ to the personality module.

19. The system according to claim 18, wherein the personality module receives the encrypted first secret key $\rho(\lambda_T)$ and the encrypted selected information $\lambda_T(T)$, decrypts the first secret key $\lambda_T$ using the third secret key $\rho$ stored in the second database; and decrypts the encrypted selected information $\lambda_T(T)$ using the first secret key $\lambda_T$ decrypted by the personality module.

20. The system according to claim 19, wherein the selected information T is stored in a third database.

21. The system according to claim 20, wherein the first and third databases are the same.

22. The system according to claim 20, wherein the second database further stores identification information ID, and wherein the personality module inserts the identification information ID into the decrypted selected information T.

23. The system according to claim 22, wherein the certification module further includes a memory recording each occurrence of enabling the selected information T to be transferred to the personality module.

24. A personality module comprising:

a database storing a first secret key $\rho$, a first public key PuA and first certification information $PrA(\rho(X))$, the first certification information $PrA(\rho(X))$ being formed by encrypting a character string X using the first secret key $\rho$, and by encrypting the encrypted character string $\rho(X)$ using a first private key PrA; and a transceiver receiving a second public key PuL encrypted using the first private key PrA.

25. The personality module according to claim 24, wherein the personality module decrypts the encrypted second public key PrA(PuL) using the first public key PuA stored in the database, encrypts the first secret key $\rho$ using the second public key PuL decrypted by the personality module, and encrypts the first certification information PrA $(\rho(X))$ using the second public key PuL decrypted by the personality module; and wherein the transceiver transmits the encrypted first secret key $PuL(\rho)$ and the encrypted first certification information $PuL(PrA(\rho(X)))$ for verification.

26. The personality module according to claim 25, wherein the transceiver receives selected information T when the transmitted encrypted first certification information is verified.

27. The personality module according to claim 26, wherein the selected information T is one of audio, visual and textual information.

28. The personality module according to claim 27, wherein the selected information T is digital information.

29. The personality module according to claim 27, wherein the selected information T is encrypted with a second secret key $\lambda_T$, and wherein, when the first certification information is verified, the transceiver receives the second secret key $\lambda_T$ encrypted using the first secret key $\rho$.

30. The personality module according to claim 29, wherein the transceiver receives the encrypted selected information $\lambda_T(T)$, and wherein the database decrypts the second secret key $\lambda_T$ using the first secret key $\rho$ stored in the database, and decrypts the encrypted selected information $\lambda_T(T)$ using the second secret key $\lambda_T$ decrypted by the personality module.

31. The personality module according to claim 30, wherein the database further stores identification information ID, and wherein the personality module inserts the identification information ID into the decrypted selected information T.

32. A certification module comprising:

a database storing an encrypted first public key PrA(PuL), a second public key PuA, an encrypted first secret key $\lambda(\lambda_T)$, a second secret key $\lambda$, a first private key PrL and a character string X, the first public key PuL being encrypted using a second private key PrA, and the first secret key $\lambda_T$ being encrypted using the second secret key $\lambda$; and a transceiver transmitting the encrypted first public key PrA(PuL) and receiving encrypted certification information $PuL(PrA(\rho(X)))$ encrypted using the first public key PuL and a third secret key $\rho$ encrypted by the first public key PuL, the encrypted certification information including the character string X, the certification module decrypting the encrypted certification information $PuL(PrA(\rho(X)))$ using the first private key PrL, decrypting the encrypted third secret key $PuL(\rho)$ to obtain the third secret key $\rho$, decrypting the encrypted certification information using the second public key PuA, decrypting the character string X contained in the encrypted certification information using the third secret key $\rho$ and enabling transmission of selected information T when the character string X contained in the encrypted certification information equals the character string X stored in the database.

33. The certification module according to claim 32, wherein the selected information T is one of audio, visual and textual information.

34. The certification module according to claim 33, wherein the selected information T is digital information.

35. The certification module according to claim 34, wherein when the character string X contained in the encrypted certification information equals the character string X stored in the database, the certification module encrypts the first secret key $\lambda_T$ using the third secret key $\rho$ decrypted by the certification module, and the encrypted first secret key $\rho(\lambda_T)$ is transmitted by the transceiver.

36. The certification module according to claim 35, wherein the selected information T is stored in another database, the another database being different from the database of the certification module.

37. The certification module according to claim 35, wherein the selected information T is stored in the database.

38. The certification module according to claim 35, further comprising a memory recording each occurrence of enabling the selected information T to be transferred.

39. A method for transferring selected information T to a database, the method comprising the steps of:

storing the first secret key $\rho$, a first public key PuA and the first certification information PrA($\rho$(X)) in a first database, the certification information including a character string X encrypted using a first secret key $\rho$ and further encrypted using a first private key PrA; and receiving from a second database a second public key PuL encrypted using the first private key PrA.

40. The method according to claim 39, further comprising the steps of:

decrypting the encrypted second public key PrA(PuL) at the first database using the first public key PuA stored in the first database;

encrypting the first secret key $\rho$ at the first database using the second public key PuL decrypted at the first database;

encrypting the certification information PrA($\rho$(X)) at the first database using the second public key PuL decrypted at the first database; and transmitting the encrypted first secret key PuL($\rho$) and the encrypted certification information PuL(PrA($\rho$(X))) to the second database for verification.

41. The method according to claim 40, further comprising the step of receiving selected information T at the first database when the transmitted encrypted certification information is verified.

42. The method according to claim 41, wherein the selected information T is one of audio, visual and textual information.

43. The method according to claim 40, wherein the selected information T is digital information.

44. The method according to claim 40, the method further comprising the step of receiving the second secret key $\lambda_T$ encrypted using the first secret key $\rho$ when the first certification information is verified.

45. The method according to claim 44, wherein the selected information T is encrypted with a second secret key $\lambda_T$, the method further comprising the steps of:

receiving the encrypted selected information $\lambda_T$(T) at the first database;

decrypting the second secret key $\lambda_T$ at the first database using the first secret key $\rho$ stored in the first database; and decrypting the encrypted selected information $\lambda_T$(T) at the first database using the second secret key $\lambda_T$ decrypted at the first database.

46. The method according to claim 45, further comprising the steps of:

storing identification information ID at the first database; and inserting the identification information ID into the decrypted selected information T at the first database.

47. A method for transferring selected information T to a database, the method comprising the steps of:

storing an encrypted first public key PrA(PuL), a second public key PuA, an encrypted first secret key $\lambda(\lambda_T)$, a second secret key $\lambda$, a first private key PrL and a character string X at a first database, the first public key PuL being encrypted by a second private key PrA, and the first secret key $\lambda_T$ being encrypted using the second secret key $\lambda$;

transmitting the encrypted first public key PrA(PuL) to a second database;

receiving an encrypted certification information PuL(PrA($\rho$(X))) and a third secret key $\rho$ encrypted by the first public key PuL from the second database at the first database, the encrypted certification information including the character string X encrypted using the third secret key $\rho$, the encrypted character string $\rho$(X) being encrypted using the first public key PuL and the encrypted character string PuL($\rho$(X)) being encrypted by the first public key PuL;

decrypting the encrypted third secret key PuL($\rho$) at the first database using the first private key PrL to obtain the third secret key $\rho$;

decrypting the encrypted certification information PuL(PrA($\rho$(X))) at the first database using the first private key PrL;

decrypting the encrypted certification information using the second public key PuA;

decrypting the character string X contained in the encrypted certification information using the third secret key $\rho$; and enabling transmission of selected information T when the character string X contained in the encrypted certification information equals the character string X stored in the first database.

48. The method according to claim 47, wherein the selected information T is one of audio, visual and textual information.

49. The method according to claim 48, wherein the selected information T is digital information.

50. The method according to claim 48, the method further comprising the steps of:

encrypting the first secret key $\lambda_T$ using the third secret key $\rho$ decrypted at the first database when the character string X contained in the encrypted certification information equals the character string X stored in the first database; and transmitting the encrypted first secret key $\rho(\lambda_T)$ to the second database.

51. The method according to claim 50, wherein the selected information T is stored in a third database, the third database being different from the first database.

52. The method according to claim 50, wherein the selected information T is stored in the first database.

53. The method according to claim 50, further comprising step of recording each occurrence of enabling the selected information T to be transferred.

* * * * *